(12) United States Patent
Okada (10) Patent No.: US 7,333,662 B2
(45) Date of Patent: Feb. 19, 2008

(54) IMAGE CODING AND DECODING USING INTERMEDIATE IMAGES

(75) Inventor: Shigeyuki Okada, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 670 days.

(21) Appl. No.: 10/077,209

(22) Filed: Feb. 14, 2002

(65) Prior Publication Data

US 2002/0154826 A1    Oct. 24, 2002

(30) Foreign Application Priority Data

Feb. 20, 2001    (JP) ............................. 2001-044004

(51) Int. Cl.
*G06K 9/36* (2006.01)
(52) U.S. Cl. ...................... 382/240; 382/232
(58) Field of Classification Search ................ 382/128, 382/240, 244–248, 232, 233; 375/240.19; 348/398.1, 408.1
See application file for complete search history.

(56) References Cited

U.S. PATENT DOCUMENTS

| 5,608,862 A | 3/1997 | Enokida |
| 6,026,192 A | 2/2000 | Maeda |
| 6,041,143 A | 3/2000 | Chui et al. |
| 6,067,383 A * | 5/2000 | Taniguchi et al. ........... 382/240 |

FOREIGN PATENT DOCUMENTS

| EP | 0272762 A2 | 6/1988 |
| JP | 07-121656 | 5/1995 |
| JP | 2000-013593 | 1/2000 |
| JP | 2000-125283 | 4/2000 |
| KR | 1999-50598 | 7/1999 |

OTHER PUBLICATIONS

An English Translated copy of Japanese Publication to Takahiro et al. (JP 2000-013593, published on Jan. 14, 2000).*

* cited by examiner

*Primary Examiner*—Duy M. Dang
(74) *Attorney, Agent, or Firm*—McDermott Will & Emery LLP (57) ABSTRACT

A wavelet transform is conducted on an original image (OI). At the moment when the first layer image (WI1) is generated, its LL sub-band component is recorded as an intermediate image (II) in an intermediate image memory (28). The wavelet transform is further conducted and then the third layer image (WI3) is obtained. Thereafter, the image is processed in a quantizer and so forth and finally a coded image in JPEG 2000 is generated. On the other hand, if an image of a relatively small size is required, the intermediate image II recorded in the intermediate image memory 28 is used as a new original image (40) and coded, instead of the original image (OI).

29 Claims, 8 Drawing Sheets

IMAGE CODING AND DECODING USING INTERMEDIATE IMAGES

BACKGROUND OF THE INVENTION

1. Field of the Invention

This invention relates to an image processing technique. This invention especially relates to an image processing method, and an image coding apparatus and an image decoding apparatus using the method.

2. Description of the Related Art

The twentieth century has been called "the century of vision", and various motion pictures and images have been created and utilized in the movies and television broadcasting. Especially in 1990s, digital image culture became commonplace in our daily life as various information devices such as personal computers, digital cameras and color printers were introduced into our homes and the number of Internet users exploded. Image compression technology such as JPEG (Joint Photographic Expert Group) and MPEG (Motion Picture Expert Group) for still images and motion images respectively has been standardized. Image distribution and reproduction have become easy and convenient for users using recording media such as CD-ROM and transmission media such as networks and broadcasting technology based on the aforementioned image compression technology. JPEG 2000 has been announced in the JPEG line of technology. In MPEG also, future target specifications have been planned and discussed. There is no doubt that such an enhanced image processing technology will soon bring people even farther into a world of digital images.

The standardization of the image data format has had the effect of facilitating data transmission and reception between digital devices. For instance, with a memory card of about half the size of a business card, data can be very easily exchanged between portable devices and information devices. The image data shot by a digital camera can be easily output to a color printer of fine quality that supports the same data format. It is expected that image data will be increasingly utilized in conjunction with various devices in the future.

SUMMARY OF THE INVENTION

In the context of the above, the inventor of the present invention has considered the problem presented below. If an original image shot by a digital camera has a resolution of 640×480, for instance, and the image is displayed in an LCD with a resolution of 320×240, an image scaling is necessary. On the other hand, in order to create a thumbnail image of 120×80 size, further image scaling is required. In general, the scaling requires processing time and an amount of memory access, that is a bandwidth, in proportion to the size of the original image to be processed. Therefore, it creates a load in proportion to the 640×480 size of the original image to produce image data for an LCD output and thumbnail image data in this example.

It is therefore an object of the present invention to provide a technique to reduce the process load in an image process, particularly a process involving image coding or decoding, and to cut processing time and power consumption.

The objects are achieved by combinations described in the independent claims. The dependent claims define further advantageous and exemplary combinations of the present invention.

According to one aspect of the present invention, an image processing method is provided. The method comprises storing an intermediate image generated during a process of coding an original image and using or adopting the intermediate image as a new original image. The original image merely means an image provided when the coding starts. When the image is coded, it is normally sufficient that final coded data are obtained, however, in this aspect of the present invention, the intermediate image generated during the coding process is saved and reused. If the resolution of the intermediate image is lower than that of the original image and the resolution of the required coded image is low, it causes less processing load to code the intermediate image as a source image than to code the original image step by step. It is to be noted that the final image or image data obtained after the completion of the coding are only referred to as "a coded image" or "coded image data" and the expression does not imply the intermediate image.

The intermediate image may be generated during a process of a hierarchical coding of the original image. This is advantageous because the intermediate image is often naturally generated during the hierarchizing process. Thereinafter the intermediate image implies an image in an intermediate layer.

The intermediate image can be considered as a new original image and subjected to a desired process. The desired process may be image coding, scaling, enlarging or reducing the resolution or the size of an image, rotation, trimming, edge emphasis or high-pass filtering, smoothing, noise reduction or low-pass filtering, color translation, and other image processing.

According to another aspect of the present invention, an image processing method, more particularly an image decoding method, is provided. The method comprises storing an intermediate image, which is generated during a process of decoding coded image data generated through a coding of an original image, separately from a final decoded image, and substituting the intermediate image for the final decoded image in a manner appropriate to a predetermined use.

When an image is decoded, it is normally sufficient that a final decoded image is obtained, however, in this aspect of the present invention, the intermediate image is obtained and utilized. For instance, even if the intermediate image has a lower resolution than the final decoded image or the intermediate image has a low frequency component as a basic component, it is usable as far as it can be displayed. An image of such low resolution may be more convenient depending on the desired use of the image, and this aspect of the present invention is advantageous in such cases. It is to be noted that the final image obtained after the completion of the decoding is only referred to as "a decoded image" and this does not imply the intermediate image.

According to still another aspect of the present invention, a data structure retrievable and usable by a computer is provided. The data structure comprises a first data region which stores identification information of an original image, a second data region which stores an intermediate image generated during a process of coding the original image, and a header region which includes link information to connect the first and the second data regions. The header region may be included either in the first or the second data region. According to this data structure, the original image or the intermediate image can be selected and used in a manner appropriate to a particular use.

Especially if the intermediate image and the original image can be displayed in the same manner, the two have high mutual substitutability. For this purpose, the coding of the original image may comprise a first processing step in which an image generated thereby remains intact to such an extent that the image can be displayed without a decoding process in such a manner that the original image is displayed, and a second processing step in which the image cannot be displayed without a decoding process in such a manner that the original image is displayed, and the intermediate image may be generated within the first processing step.

According to still another aspect of the present invention, an image coding apparatus is provided. The apparatus comprises a coding unit which codes an original image, and an intermediate image memory which stores an intermediate image generated during the coding process separately from a final coded image.

The coding unit may generate the intermediate image by hierarchizing the original image, or by reducing the resolution of the original image, or by utilizing low frequency components of the original image. Furthermore, the coding unit may generate the intermediate image using a sub-band which appears when a two-dimensional wavelet transform is conducted on the original image, and which is composed of low frequency components in both of x, y directions.

The apparatus may further comprise an image selecting unit which selects either the original image or the intermediate image according to a particular use of the image, and forwards the selected image to the coding unit. In order to determine the use of the image, a table which records the various uses in relation to appropriate the image sizes and other image attributes may be provided.

According to still another aspect of the present invention, an image coding apparatus is provided. The apparatus comprises a shooting block, a block which controls the shooting block mechanically, and a processing block which processes a digital image obtained by the shooting block. The processing block comprises a coding unit which codes or encodes the digital image, and an intermediate image memory which stores an intermediate image generated during the coding process separately from a final coded image. According to this aspect of the present invention, the original image is not necessarily coded for each of a plurality of uses and it can contribute to a reduction in processing load and processing time in the apparatus.

According to still another aspect of the present invention, an image decoding apparatus is provided. The apparatus comprises a decoding unit which decodes coded image data which are generated when an original image is coded, and an intermediate image memory which stores an intermediate image generated during the decoding process separately from a final decoded image. According to this aspect of the present invention, either the intermediate image or the decoded image can be selected. For this purpose, the intermediate image memory may store the intermediate image in association with the final decoded image. The apparatus may further comprise an image selecting unit which selects either the final decoded image or the intermediate image according to a particular use of the image and outputs the selected image.

The decoding unit may conduct a two-dimensional wavelet inverse transform during the decoding process and generate the intermediate image using a sub-band which is composed of low frequency components in x, y directions.

According to still another aspect of the present invention, an image decoding apparatus is provided. The apparatus comprises a receiving block which receives a signal, a processing block which processes the received signal, and a play-back block which plays back the processed signal. The processing block comprises a decoding unit which decodes coded image data which comprises a digital image extracted from the received signal, and an intermediate image memory which stores an intermediate image generated during the decoding process separately from a final decoded image. The apparatus further comprises an interface block which outputs the intermediate image to an external device. The external device may be a passive element, for instance, a transmission medium such as a network or a memory. According to this aspect of the present invention, the intermediate image generated as a by-product or as temporary data during the process of obtaining the decoded image can be effectively utilized and thereby appropriate images can be obtained for different purposes during the sequence of the decoding process.

According to a further aspect of the present invention, an image processing method is provided. The method comprises storing an image, which is generated during a process of processing an original image for a predetermined purpose and remains intact to such an extent that an image can be displayed in the same manner as the original image, separately from the original image; and reusing the stored image in a manner appropriate to a particular use.

According to still another aspect of the present invention, an image processing method is provided. The method comprises extracting an image, which is generated during a process of restoring an image data and remains intact to such an extent that an image can be displayed in the same manner as an image to be finally obtained, separately from the image to be finally obtained.

Moreover, any arbitrary replacement or substitution of the above-described structural components and the steps, expressions replaced or substituted in part or whole between a method and an apparatus as well as addition thereof, and expressions changed to a system, a computer program, a data structure, recording medium or the like are all effective as and are encompassed by the present invention.

This summary of the invention does not necessarily describe all necessary features, so that the invention may also be a sub-combination of these described features.

DETAILED DESCRIPTION OF THE INVENTION

The invention will now be described by reference to the preferred embodiments. This does not intend to limit the scope of the present invention, but exemplify the invention. In the below embodiments, JPEG 2000 is employed for image coding and decoding, however, the outline of JPEG 2000 is already known and therefore such known parts are not described hereinafter in detail.

Embodiment 1

Figure 1:
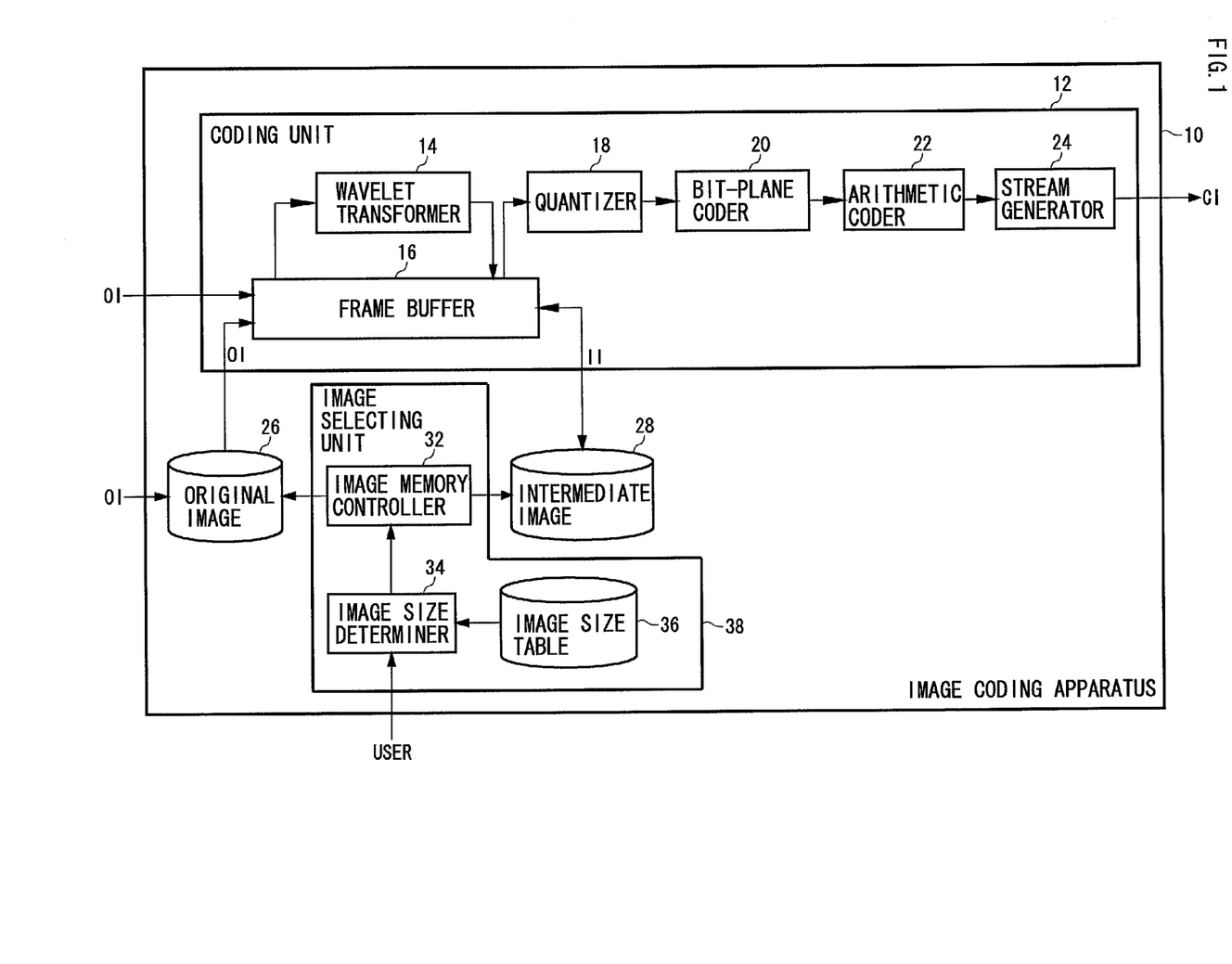
FIG. 1 is a block diagram of an image coding apparatus according to Embodiment 1.

FIG. 1 shows the configuration of an image coding apparatus 10 according to Embodiment 1. The image coding apparatus 10 may be a normal computer and comprises a CPU, memory and program modules to code images loaded in the memory. The blocks in FIG. 1 depict functions characteristic of the present embodiment and those skilled in the art understand the functional blocks can be embodied as hardware only, software only or as a combination of the two.

The image coding apparatus 10 comprises a coding unit 12, an original image memory 26, an intermediate image memory 28, and an image selecting unit 38. The coding unit 12, which works on the specifications of JPEG 2000, comprises a wavelet transformer 14, a frame buffer 16, a quantizer 18, a bit-plane coder 20, an arithmetic coder 22 and a stream generator 24. An original image OI is read in the frame buffer 16 when the coding process starts. The image is input directly into the frame buffer 16 from the outside or input via the original image memory 26. In the following the image is assumed to be input via the original image memory 26.

Figure 2:
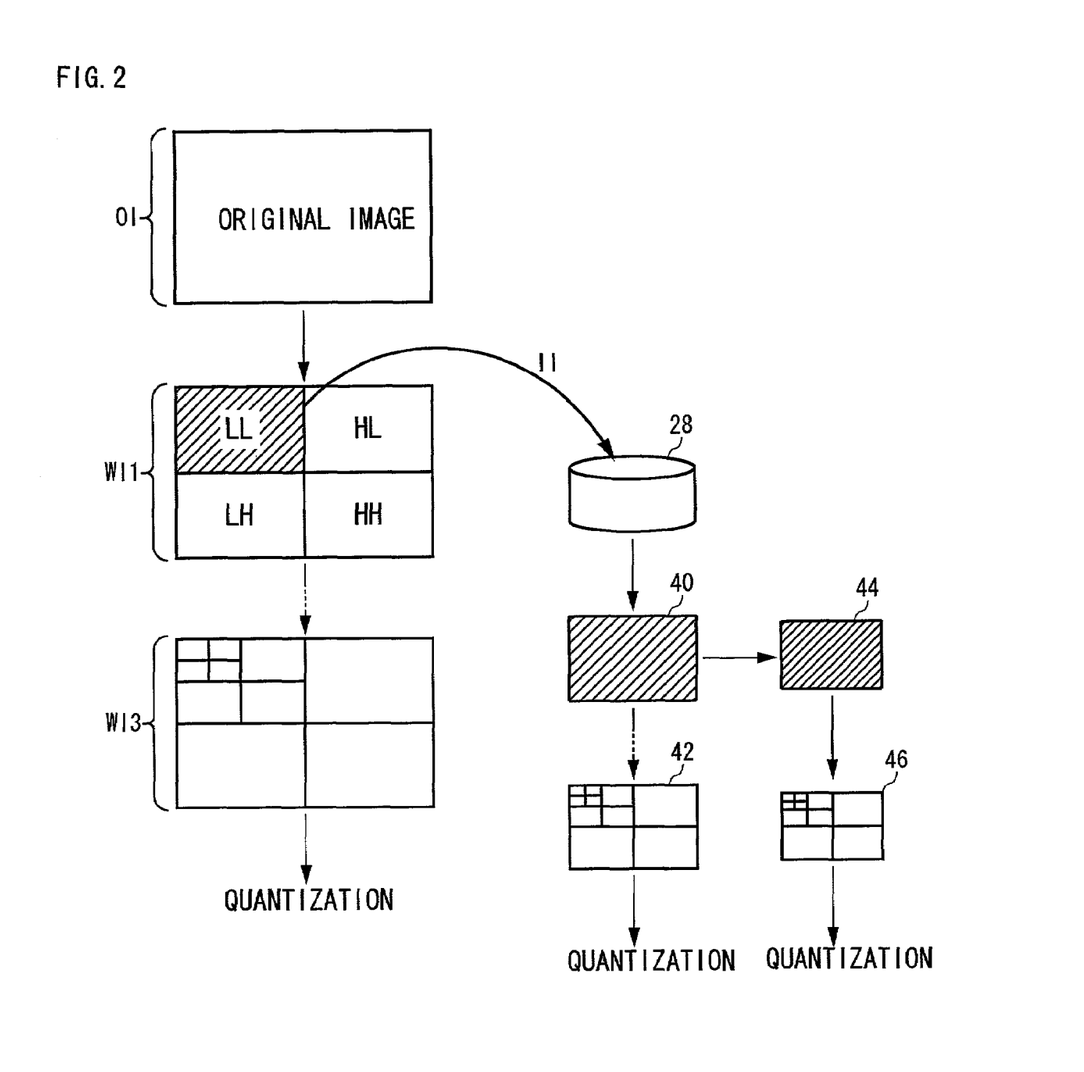
FIG. 2 shows an image coding procedure in Embodiment 1.

The original image OI in the frame buffer 16 is hierarchized by the wavelet transformer 14. The wavelet transformer 14 in JPEG 2000 employs a Daubechies filter. As shown in FIG. 2, the filter simultaneously works as a low-pass filter and a high-pass filter in x, y directions and divides the original image into four frequency sub-bands. The four sub-bands are: the LL sub-band which is composed of low frequency components in x and y directions, the HL and LH sub-bands which are composed of low frequency components in one of the x and y directions and high frequency components in the other direction, and the HH sub-band which is composed of high frequency components in x and y directions. The number of pixels in each sub-band image is half of those of the original image, respectively. The filtering process therefore renders four sub-band images, the sizes of which are one-fourth the size of the input image.

The wavelet transformer 14 conducts a filtering process on the rendered LL sub-band, which is divided into LL, HL, LH and HH sub-bands. By repeating the filtering process, the LL sub-band rendered in the final filtering is obtained as an image which is closest to the DC component of the original image OI. High frequency components are dominant in the HH sub-band, followed by the HL and LH sub-bands, and the LL image in the same layer. The previous layer rendered in the previous filtering process comprises four sub-bands in which high frequency components are more dominant than those rendered in the present filtering process. In FIG. 2, for example, the upper left sub-band image has lower frequency components and the bottom right sub-band image has higher frequency components.

Thereafter, although the detail is not described, the hierarchized image is input into the quantizer 18, the bit-plane coder 20, the arithmetic coder 22 and the stream generator 24 starting with the lowest frequency component, and the final coded image data CI are generated and output from the stream generator 24.

The intermediate image memory 28, which is a structure characteristic of the present embodiment, stores an intermediate image II obtained during the process by the wavelet transformer 14. Normally, such an intermediate image II is generated temporarily in the frame buffer 16 and it has no special use by itself. However, the intermediate image is positively utilized in the present embodiment so that the advantages enumerated below can be obtained.

The image selecting unit 38 includes an image memory controller 32, an image size determiner 34, and an image size table 36. The image may have various uses such as printing with a super fine quality and saving as a thumbnail image, and the quality and the resolution of the image may differ according to such various uses. In consideration of this point, the image size determiner 34 takes an input to determine the desired use of the image from the user. The image size table 36 records beforehand the various uses of the image and the resolution or the image size suitable for each of such uses. The image size determiner 34 determines a suitable image size by referring to the image size table 36 for the desired use input by the user. The memory controller 32 is notified of the result determined and provides the frame buffer 16 with the original image OI retrieved from the original image memory 26 or the intermediate image II of an appropriate size retrieved from the intermediate image memory 28, according to the suitability of the image size.

FIG. 2 illustrates the relationship between the original image OI processed by the wavelet transformer 14 and the intermediate image II stored in the intermediate image memory 28. The original image OI is transformed into the first layer image WI1 during the first filtering by the wavelet transformer 14. The LL sub-band of this image WI1 is further filtered and the third layer image WI3 is finally generated in the case of FIG. 2. This image is thereafter processed by the quantizer 18 and the succeeding components.

The intermediate memory 28 stores the LL sub-band image as an intermediate image, which is generated during the process by the wavelet transformer 14. In this example, the LL sub-band of the first layer image WI1 is stored immediately as an intermediate image II. The stored intermediate image II is reused according to the use specified by the user. For instance, when a quarter size of the original image OI is sufficient for the specified use, the intermediate image II recorded in the intermediate image memory 28 is retrieved and this image is provided to the frame buffer 16 as a new original image 40. Then the image is processed by the wavelet transformer 14 and the succeeding components and the coded image data 42 are generated. The advantages of using the intermediate image II are as follows.

1. Normally, the coding process by the image coding apparatus 10 starts with the input of the original image OI. Therefore, whenever the coded image data are required, the original image OI is input and coded. However when an image of small size is sufficient for a particular use, it is very wasteful to use the original image of large size as a source image and code it again. As described above, since the image processing in general causes a processing load in proportion to the image size, the processing load can be reduced to about one-fourth by using the intermediate image II of a quarter size as the source image of the coding in the example of FIG. 2. As a result, it is expected that the frame buffer 16 can achieve an improvement in both capacity and power consumption.

2. The scaling process can be skipped in certain cases. In the example of FIG. 2, if the user requires an image of a quarter size, it is necessary to scale down the original image OI to the quarter size in any one of the stages. However if the intermediate image II is used, it can be considered that the scaling process is virtually completed at the moment when the LL sub-band of the first layer image WI1 is extracted. Therefore an improvement in the process efficiency can be achieved in this sense.

3. Image quality can be maintained. The wavelet transformer 14 of JPEG 2000 is designed in consideration of image quality in a low bit rate and the LL sub-band of the first layer image WI1 can normally achieve an equivalent or fairly good image quality compared with that when a general filter is used for scaling the original image OI. Therefore when the extraction of the LL sub-band works as a scaling process, the advantage of the image quality in JPEG 2000 can be obtained.

4. Because the intermediate image has the same data format as the original image OI, the intermediate image can be reused. Namely, the process by the wavelet transformer 14 is a pixel-based filtering, and although the pixel value and the image size change, the processed image remains intact to such an extent that the image can be displayed in a manner similar to that in which the original image OI is displayed. Therefore the intermediate image II can be used as a new original image, and it can also be used for displaying with no additional processing.

It is to be noted that if a smaller image than the LL sub-band of the first layer image WI1 is required, the new original image 40 retrieved from the intermediate image memory 28 is scaled down to an image 44 of the necessary size and the scaled image 44 is used as a source image for the coding so that the desired coded image data 46 can be obtained. As a matter of course, the LL sub-band of the second layer image generated by the wavelet transform or the LL sub-band of the third layer image WI3 may be used as the intermediate image II. In any case, since an image whose size is smaller than that of the original image OI is used as a source image, the process is highly efficient.

Figure 3:
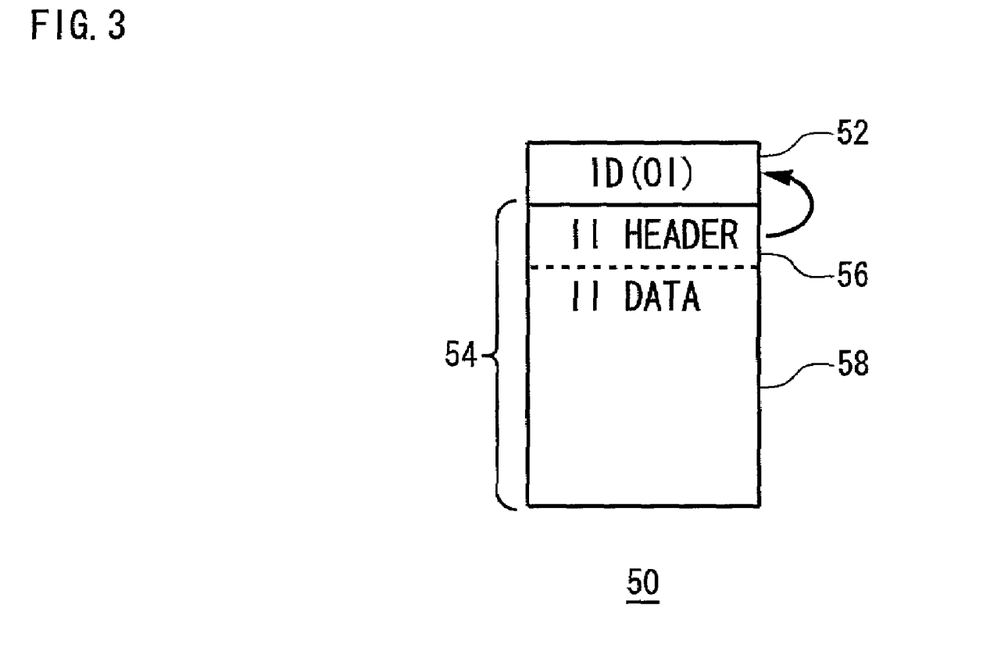
FIG. 3 shows a structure of image data stored in an intermediate image memory of Embodiment 1.

FIG. 3 illustrates a structure of the image data 50 stored in the intermediate image memory 28. The image data 50 includes the first data region 52 which stores an identifier ID (shown as "ID(OI)" in the figure) of the original image OI, and the second data region 54 which stores the data of the intermediate image II. The second data region 54 further includes a header region 56 (shown as "II header") which records the header information relating to the intermediate image II, and a data region 58 (shown as "II data") which stores the data relating to the intermediate image II itself. The header region 56 records a link to the first data region 52, which indicates that this intermediate image II is obtained by reference to the original image OI.

Figure 4:
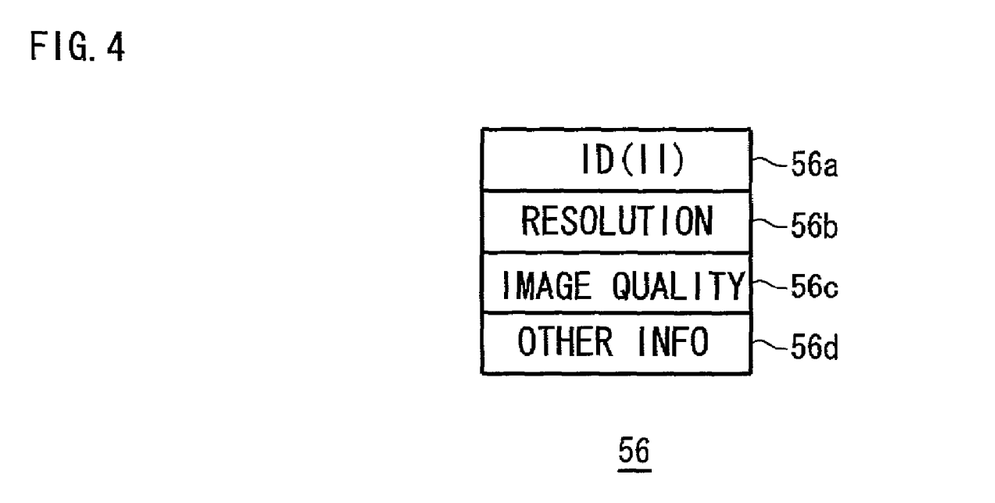
FIG. 4 shows a structure of the header region in the image data of FIG. 3.

FIG. 4 shows a detailed structure of the header region 56. The header region 56 includes the first sub-region 56a which stores the identifier ID (shown as "ID(II) in the figure) of the intermediate image II, the second sub-region 56b which stores the resolution information relevant to the intermediate image II, the third sub-region 56c which stores the image quality information concerning the intermediate image II, and the fourth sub-region 56 which stores the other information.

The correspondence relation between the intermediate image II and the original image OI is identified by the content of the first sub-region 56a. The image memory controller 32 can extract an appropriate intermediate image II from the intermediate image memory 28 according to the content of the second sub-region 56b. The third sub-region 56c is an optional structure and it contains objective or subjective information regarding the image quality of the intermediate image II. The former information is, for example, an error in the intermediate image II with regard to the original image OI and the latter information is, for example, a judgment criterion regarding the suitability of the image for the specified use. For instance, if the intermediate image II is suitable for printing by a 300 dpi printer but cannot come up to the standard of a 1200 dpi printer, this fact is recorded in this region. The third sub-region 56c is also referred to by the image memory controller 32 and if one intermediate image II is not suitable for the use requested by the user, another intermediate image II or the original image OI is forwarded to the frame buffer 16. The fourth sub-region 56d is also an optional structure and it records, for instance, a process by which the intermediate image II is generated from the original image OI. This information will be referred to when appropriate, for instance when an intermediate image II is newly generated.

Figure 5:
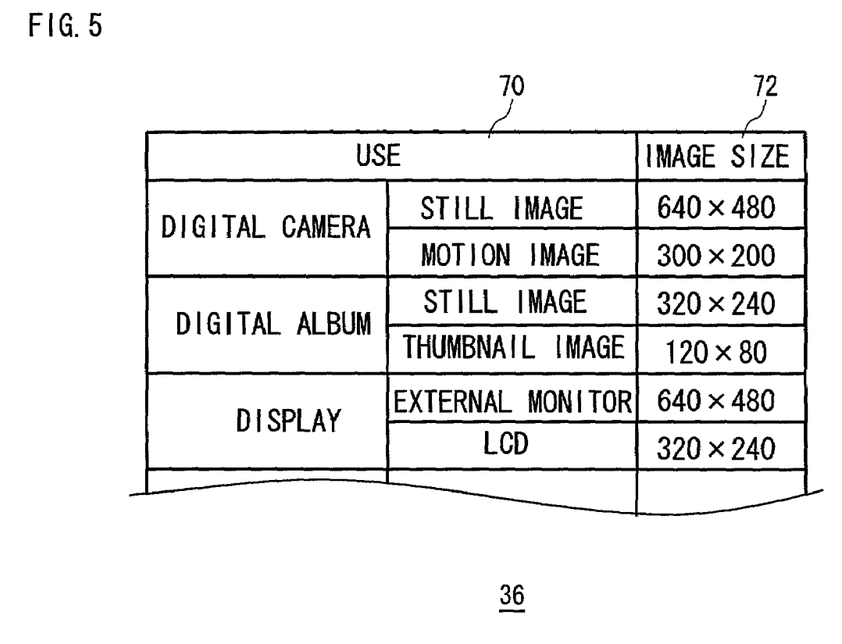
FIG. 5 shows an internal structure of the image size table of FIG. 1.

FIG. 5 illustrates a detailed structure of the image size table 36. The image size table 36 contains a use column 70 and an image size column 72. In the use column 70 the user's purpose for using the image such as a still image or a motion picture for a digital camera and so forth is listed. On the other hand, in the image size column 72 the most appropriate image size appears, for instance, in a form such as 640×480. The uses described in the use column 70 are displayed to the user via the image size determiner 34 so that the user can select a desired use from among them. The image size described for each of the uses is defined on the basis of the specifications of the digital camera that the user possesses, the specifications of a generic digital camera, and so forth.

If the size of the original image OI is 640×480 and the recording of a still image for a digital camera is specified as a use by the user: in this case, since the image size suitable to the desired use is also 640×480 according to FIG. 5, the original image OI itself is forwarded to the coding unit 12 and the coded image data CI is generated. The intermediate image II is recorded in the intermediate image memory 28 during this coding process. For the purpose of explanation, let the intermediate image II of 320×240 size obtained through the first filtering by the wavelet transform 14 and the intermediate image II of 160×120 through the second filtering be recorded together in the intermediate image memory 28.

In this situation, the user might specify the recording of a motion picture for a digital camera. In this case, the appropriate size for the motion picture is 300×200 according to the image size column 72 of FIG. 5, and the intermediate image II of 320×240 size is retrieved from the intermediate image memory 28 and forwarded to the frame buffer 16. Thereafter, through the process of a CPU, a DSP and so forth not shown in the figure, the size of this intermediate image II is scaled down to 300×200 and processed by the wavelet transformer 14, the quantizer 18 and so forth and the coded image data CI of 300×200 size is finally output. To scale down from 320×240 to 300×200 requires only about one fourth of the load required if the original image OI is used as the source image for coding.

The user might further indicate that an image shot by a digital camera should be saved as a thumbnail image for a digital album. An image size suitable for this use is determined to be 120×80 according to the image size column 72. Therefore the intermediate image II of 160×120 image size is retrieved from the intermediate image memory 28 by means of the link between the image size determiner 34 and the image memory controller 32 and it is forwarded to the frame buffer 16. Scaling is also conducted on this intermediate image II and its image size is scaled down to 120×80 and thereafter it is input into the wavelet transformer 14, the quantizer 18 and so forth, and finally coded image data CI are obtained. This scaling process requires only one-sixteenth of the processing required when the original image OI is used as the source image for coding.

If the user further indicates that the image shot by the digital camera should be recorded as a still image for the digital album, a suitable image size for this purpose is determined to be 320×240 according to the image size column 72. In this case, the intermediate image II of 320×240 image size is retrieved from the intermediate image memory 28 by means of the link between the image size determiner 34 and the image memory controller 32 and it is forwarded to the frame buffer 16. Since the size of this intermediate image II corresponds to the targeted image size, the scaling process can be skipped. Thereafter the image is input into the wavelet transformer 14, the quantizer 18 and so forth, and finally coded image data CI of the desired size are obtained.

As described above, according to the present embodiment, since the process time and the bandwidth for the scaling can be greatly reduced, a digital camera can conduct the recording of a still image and the shooting of a movie picture simultaneously at high resolution. Likewise, even when a still image and a thumbnail image are recorded simultaneously, a high-speed continuous shoot, for instance, can be easily conducted. Therefore, by exploiting the processes and the structures in JPEG 2000 and utilizing the high quality image filtering provided in JPEG 2000, an improvement in the efficiency of image processing can be achieved with a relatively simple configuration. Consequently, the commodity value of an image processing apparatus such as a digital camera or others can be enhanced and an improvement in its operability can be realized.

Embodiment 2

Figure 6:
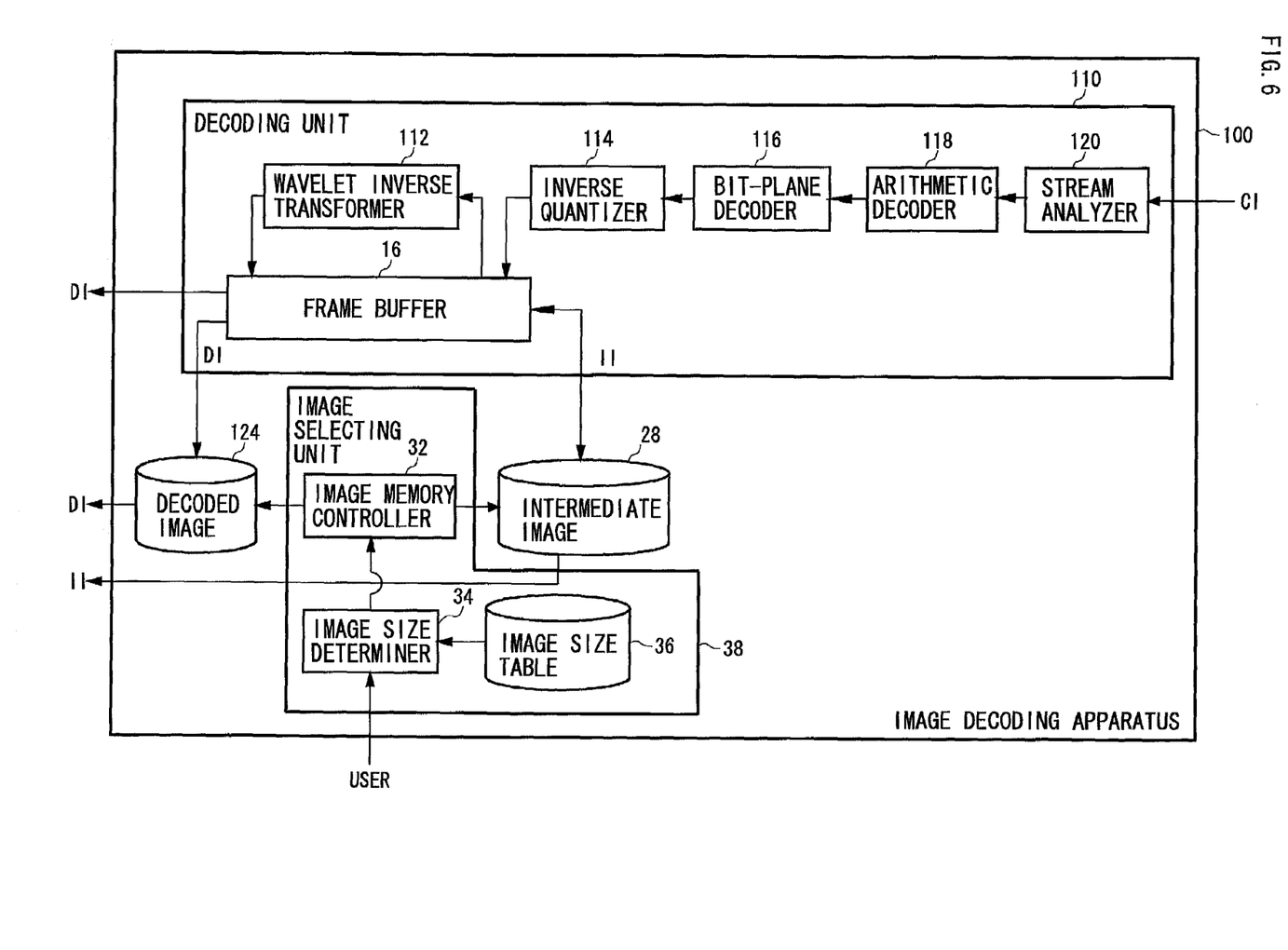
FIG. 6 is a block diagram of an image decoding apparatus according to Embodiment 2.

FIG. 6 shows the configuration of an image decoding apparatus 100 according to Embodiment 2. The image decoding apparatus 100 can undertake the decoding procedure of JPEG 2000 and its main process can be said to be an inverse transform of the process in the image coding apparatus 10 of FIG. 1. It is to be noted that the structure similar to that of FIG. 1 has the same numeral mark assigned to it and its explanation is therefore omitted.

The image decoding apparatus 100 includes a decoding unit 110, a decoded image memory 124, an intermediate image memory 28, and an image selecting unit 38. The coding unit 110 includes a stream analyzer 120 which sequentially processes coded image data CI, an arithmetic decoder 118, a bit-plane decoder 116, an inverse quantizer 114, a wavelet inverse transformer 112, and a frame buffer 16 which serves as a work area.

As a general process, the coded image data CI is processed by the stream analyzer 120 and the succeeding components and finally a decoded image DI is stored in the decoded image memory 124. As a matter of course, the decoded image DI may be output directly. However, the case in which the decoded image DI is stored in the decoded image memory 124 is considered hereinafter.

On the other hand, a process characteristic of the present embodiment is in that the intermediate image II generated during the process by the wavelet inverse transformer 112 is appropriately stored in the intermediate image memory 28.

Figure 7:
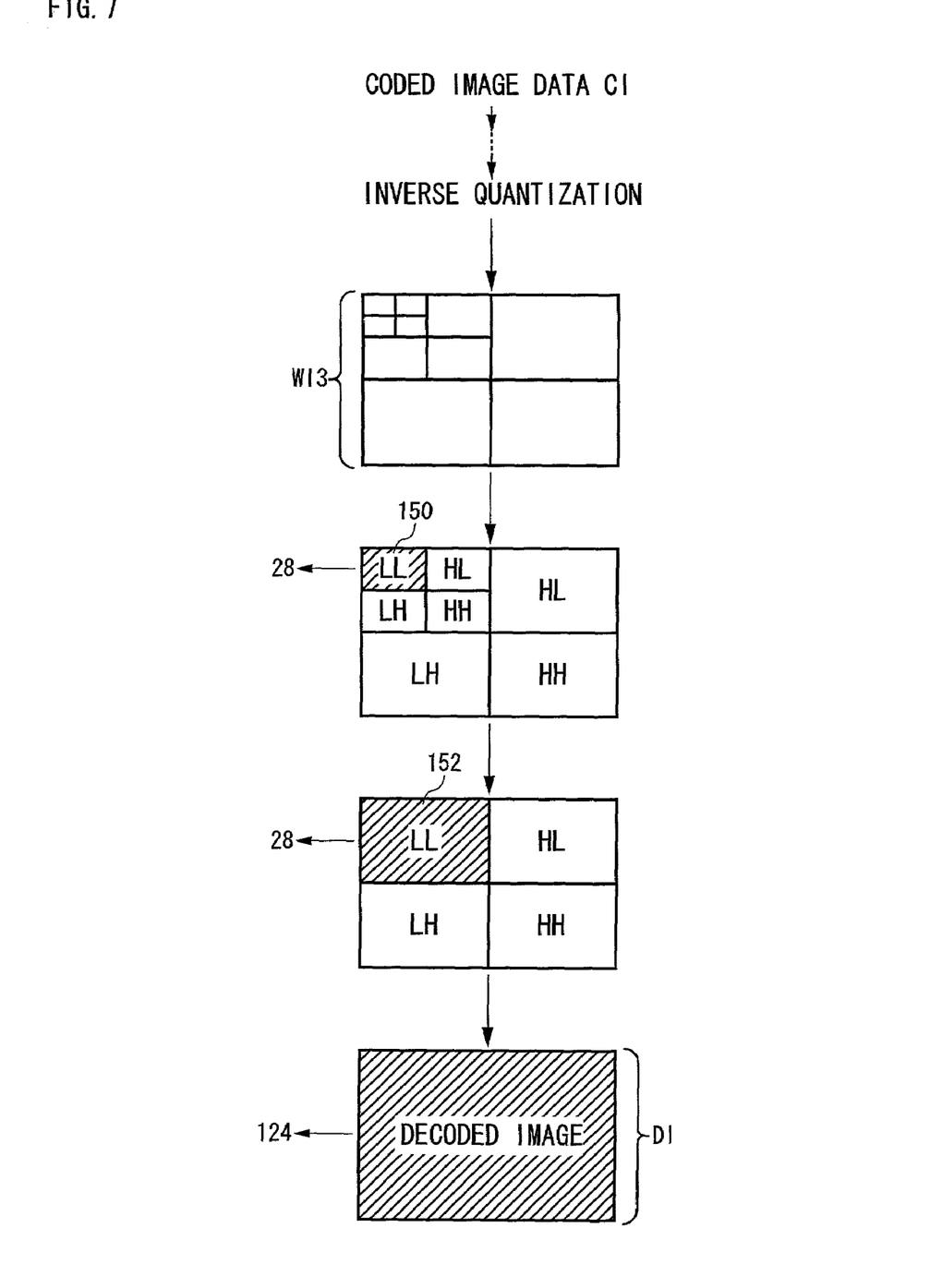
FIG. 7 shows an image decoding procedure in Embodiment 2.

FIG. 7 shows the procedure followed by the image decoding apparatus 100. First, the provided coded image data CI is processed by the stream analyzer 120, the arithmetic coder 118, the bit-plane decoder 116, and the inverse quantizer 114 and thereby reverts to the third layer image WI3. Thereafter, the second layer image is obtained in the first inverse transform by the wavelet inverse transformer 112 and its LL sub-band 150 is recorded in the intermediate image memory 28. Then, the image corresponding to the first layer is obtained in the second inverse transform by the wavelet inverse transformer 112 and its LL sub-band 152 is likewise recorded in the intermediate image memory 28. Finally, the decoded image DI is obtained in the third inverse transform and this image is stored in the decoded image memory 124.

Therefore, the small LL sub-band 150 obtained in the first inverse transform can be used as a thumbnail image for instance, while the LL sub-band 152 obtained in the second inverse transform can be output into an LCD and the largest decoded image DI finally obtained can be output into an external monitor or a printer.

According to the present embodiment, images of different sizes, each of which is routinely decoded according to a particular use, can be obtained at a single decoding process. Therefore, as explained in reference to Embodiment 1, it is advantageous in reducing the processing load, and also allows the scaling process to be skipped.

The present embodiment can also utilize the high quality image filtering facility of JPEG 2000 and thereby produce an excellent effect without necessitating an increase in the number of hardware components. As it is in Embodiment 1, the intermediate image II is already present to such an extent that it can be displayed in a manner similar to the manner in which the decoded image DI is displayed, already at the moment when the intermediate image II is extracted, and this fact is utilized. Namely the intermediate image II of a desired size can be effectively forwarded to various types of devices, each of which requires a different image size.

Embodiment 3

Figure 8:
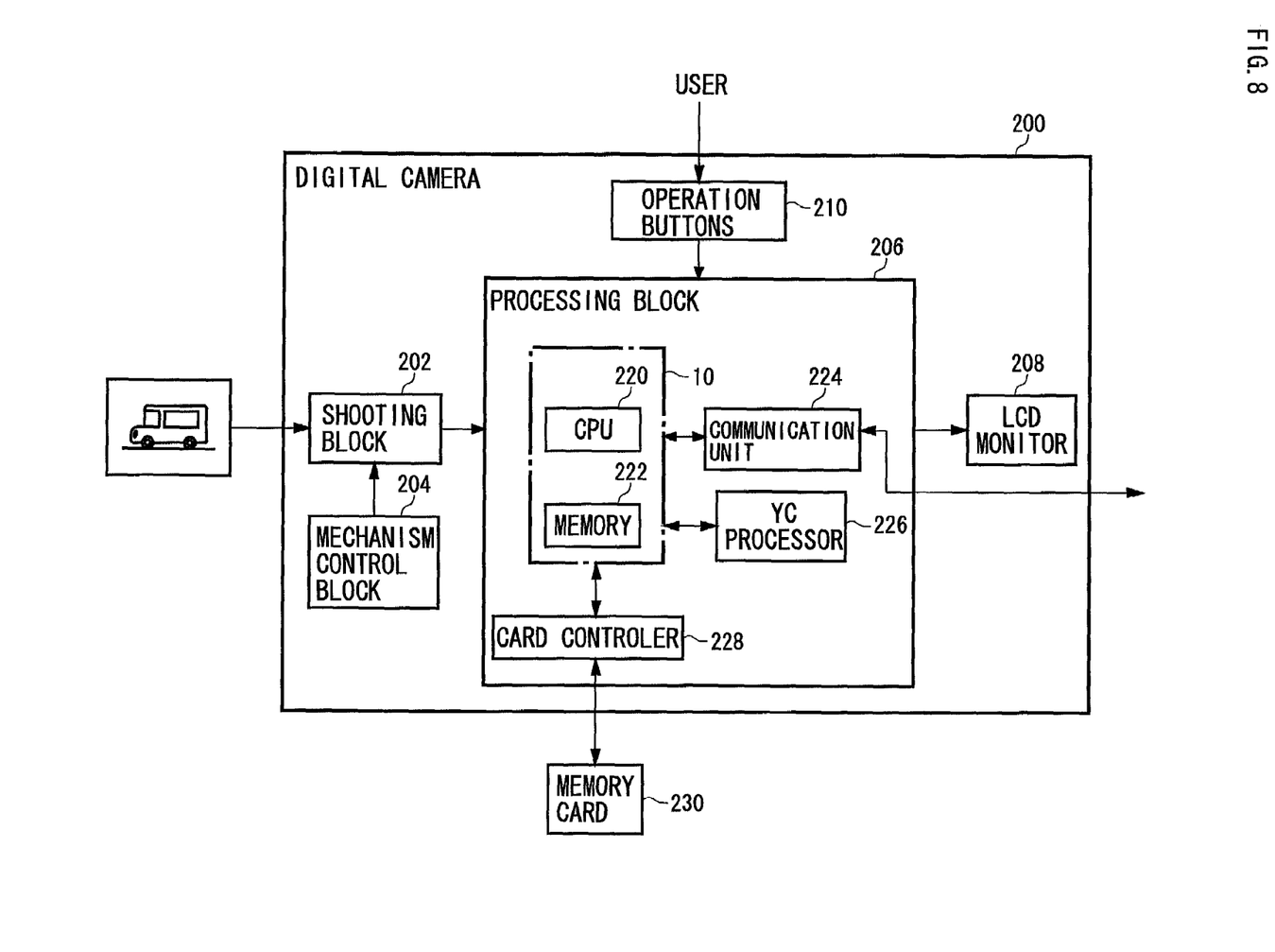
FIG. 8 is a block diagram of a digital camera according to Embodiment 3.

FIG. 8 shows the configuration of a digital camera 200 according to Embodiment 3. The digital camera 200 comprises a shooting block 202, a mechanism control block 204, a processing block 206, an LCD monitor 208 and operation buttons 210.

The shooting block 202 comprises a lens, a lens stop, an optical low-pass filter (LPF), a CCD and a signal processor (not shown). The CCD accumulates charge according to the amount of light received from an object imaged on the light receiving plane of the CCD. The charge is read as a voltage signal, which is decomposed into R, G and B components in the signal processor. The components are subjected to white balance adjustment and gamma correction. The R, G and B signals are then input into an A/D converter from which digital image data are output to the processing block 206.

The mechanism control block 204 controls the optical system including zooming, focusing and iris of the shooting block 202. The processing block 206 comprises a CPU 220, memory 222, a YC processor 226, a card controller 228 and a communication unit 224. The image coding apparatus 10 of Embodiment 1 is realized with some of the functions of the CPU 220, and an image coding program loaded in the memory 222. The frame buffer 16, the original image memory 26, and the intermediate image memory 28 of Embodiment 1 are realized using part of the memory 222.

From the digital image data the YC processor 226 generates a luminance signal Y, chroma signals B-Y and R-Y. The luminance signal and the chroma signals are separately coded in the original image OI. The coded image data CI are output via the communication unit 224 or are written into the memory card 230 via the card controller 228.

The communication unit 224 conducts a protocol transform in accordance with a standardized communication specification. The communication unit 224 may transmit data from and to a printer, a game player and other external devices via respective interfaces.

The LCD monitor 208 displays the image of an object, shooting/replay mode, zoom ratio, date, and so on. The operation buttons 210 may include a power switch, a release switch and so on to shoot a picture or to set operational modes.

In this configuration, the following operations can be provided with the image coding apparatus 10 incorporated in the processing block 206.

1. A still image may be shot as a snapshot and may be compressed and recorded in the memory card 230. While still images are being recorded, motion images can be shot and compressed and recorded in the memory card 230. As a matter of course, such images may be directly output to a printer instead of being recorded in the memory card 230, or they may be directly uploaded into a user's Web page via the communication unit 224 and the Internet.

2. While a still image is shot and coded, a thumbnail image may be simultaneously generated and both of images recorded in the memory card 230 or output to the outside. Such thumbnail images may be very useful in creating a digital album.

Embodiment 4

Figure 9:
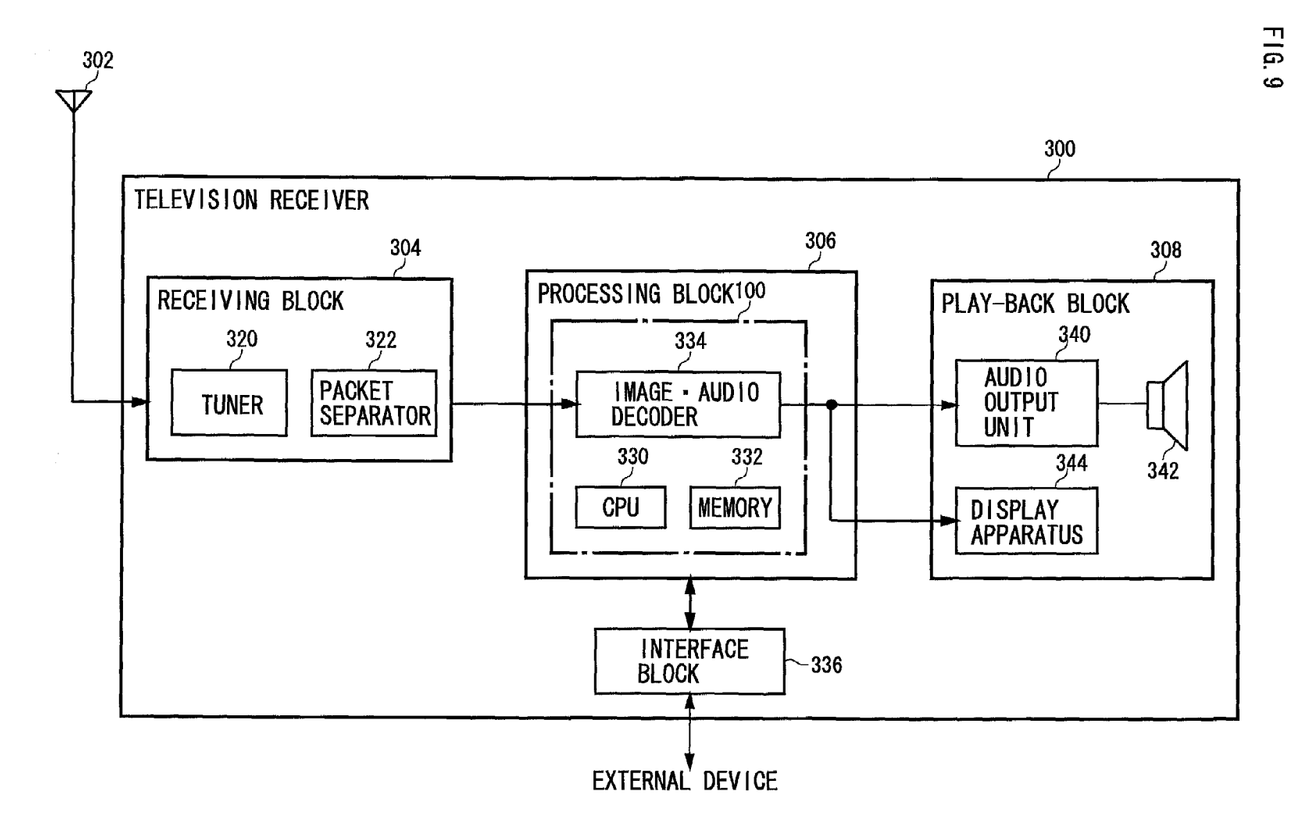
FIG. 9 is a block diagram of a television receiver according to Embodiment 4.

FIG. 9 shows the configuration of a television receiver 300. The television receiver 300 includes an antenna 302, a receiving block 304 which receives a broadcast wave via the antenna 302, a processing block 306 which processes image and audio data obtained through the process applied by the receiving block 304, and a play-back block 308 which plays the audio and image data decoded by the processing block 306. An interface block 336 outputs the image data decoded by the processing block 306 to an appropriate external device.

The receiving block 304 includes a tuner 320 and a packet separator 322. The tuner 320 selects a transponder which includes a channel selected by a user and conducts a QPSK demodulation. A stream which includes a plurality of transport packets obtained in the demodulation is forwarded to the packet separator 322. The packet separator 322 is a demultiplexer and it separates a packet corresponding to a desired channel and outputs to the processing block 306.

An image and audio decoder 334 in the processing block 306 works in cooperation with a CPU 330 and a memory 332 and thereby decodes the image and audio data which are coded and transmitted by a broadcasting station. The image and audio decoder 334 decodes an input packet and outputs audio data to an audio output unit 340 and image data to a display apparatus 344. The audio output unit 340 conducts a predetermined process on the input audio data and finally audio is output to a speaker 342. The part of the configuration of the processing block 306, that is the image and audio decoder 334, the CPU 330, and the memory 332, which relates to the image decoding, corresponds to the image decoding apparatus 100 of Embodiment 2.

In this configuration, the following operations can be provided with the image decoding apparatus 100 incorporated in the processing block 306.

1. While a normal screen is displayed in the display apparatus 344, a smaller image is displayed in an LCD of an external portable terminal in real time via the interface block 336.

2. Likewise, while a normal screen is displayed in the display apparatus 344, any screen may be captured and recorded with an image of small size.

3. Likewise, while a normal screen is displayed in the display apparatus 344, any image of a very small size may be captured and attached to electronic mail in thumbnail image size.

Although the present invention has been described by way of exemplary embodiments, it should be understood that many changes and substitutions may be made by those skilled in the art without departing from the spirit and the scope of the present invention which is defined only by the appended claims. Such changes and substitutions may be provided as follows.

In the above embodiments, image coding and decoding are explained as an example of image processing, however, the present invention is not only limited to these, but also applicable to any image processing in which any transitive status in the image process can be recorded as an intermediate image. For instance, if the original image is processed by a predetermined filter a plurality of times and hierarchized, it is advantageous because images of the intermediate layers can be obtained naturally. The filter may be any filter such as a normal average filter and the like.

For a similar reason, the present invention can be advantageously applied to image processing of any progressive nature. For instance, if an image that appears at an earlier stage of the progressive display is saved as an intermediate image, it can be reused for a predetermined purpose.

The scaling in the embodiments is a process in a reducing direction, however, as a matter of course this may be a process in the direction of extension. In such a case, an interpolation process may be applied between pixels so that the image size can be scaled up.

FIG. 1 and FIG. 6 depict the intermediate image memory 28 as an independent structure, however, this memory may be unified with other memories such as the frame buffer 16 and others. In essence, it is sufficient that there exists a memory area for saving the intermediate image II.

In Embodiment 1 the image coding apparatus 10 is explained as a unified configuration, and in Embodiment 2 the image decoding apparatus 100 is explained as a unified configuration. Any parts of these configurations, however, may exist in remote locations and the configurations as a whole may have a function of utilizing an intermediate image. For example, the original image memory 26 and the intermediate image memory 28 of FIG. 1, the decoded image memory 124 of FIG. 6 and so forth may be stored in a remote storage facility such as a hard disc and thereby a digital archive with a high potential for reusability can be built up for future use.

The image data 50 of FIG. 3 relate the intermediate image data with the original image. In addition to this configuration, the coded image data CI may be stored related with these data. In this case, the most appropriate data can be used according to various uses and situations.

As a matter of course, the image selecting unit 38 of FIG. 1 and FIG. 6 is an optional structure and it may receive an instruction concerning an image selection directly from the outside and may appropriately retrieve an intermediate image using the instruction.

A digital camera is included in the explanation of Embodiment 3. The present invention, however, may naturally be applied to other electronic devices. For example, the present invention can be easily applied to a facsimile machine, a copy machine, a scanner and the like which have a shooting block and a processing block.

A television receiver is included in the explanation of Embodiment 4. The present invention, however, may be applied to other items of apparatus which have a receiving block and a processing block such as a mobile phone accessible to the Internet or various types of PDA (Personal Digital Assistant).

What is claimed is:

1. An image processing method comprising:
    storing an intermediate image which is generated during a process of coding an original image to generate a first coded image and has a lower resolution than the original image;
    receiving an input to determine a user's purpose for using a second coded image from the user;
    determining a suitable resolution of the second coded image for the user's purpose;
    selecting either the original image or the intermediate image according to the suitable resolution determined;
    and generating the second coded image with the suitable resolution for the user's purpose by performing a coding process using the selected image as a new original image.

2. The method of claim 1, wherein a scaling process is skipped automatically by using the intermediate image when the selected image is the intermediate image.

3. The method of claim 1, wherein the coding process using the selected image includes at least one of image coding, scaling, enlarging or reducing the resolution or the size of an image, rotation, trimming, edge emphasis or high-pass filtering, smoothing, noise reduction or low-pass filtering, and color translation.

4. An image processing method comprising:
    storing a plurality of intermediate images in an intermediate layer, which are generated during a process of a hierarchical coding of an original image to generate a first coded image and have resolutions which are different from each other and lower than the original image, separately from the first coded image;
    receiving an input to determine a user's purpose for using a second coded image from the user;
    determining a suitable resolution of the second coded image for the user's purpose;
    retrieving an intermediate image selected from the plurality of intermediate images according to the suitable resolution determined; and
    generating the second coded image with the suitable resolution for the user's purpose by performing a coding process using the retrieved intermediate image as a new original image.

5. The method of claim 4, wherein the coding process using the retrieved intermediate image is a process of a hierarchical coding of the intermediate image.

6. The method of claim 4, wherein a scaling process is skipped automatically by using the intermediate image.

7. An image processing method comprising:
    storing a plurality of intermediate images, which are generated during a process of decoding coded image data generated through a coding of an original image and have resolutions which are different from each other and lower than a final decoded image, separately from the final decoded image;
    receiving an input to determine a user's purpose for image outputting from the user;
    determining a suitable resolution for the user's purpose by referring to an image size table which records resolutions suitable for each purpose for image outputting;
    selecting and retrieving an intermediate image which has the suitable resolution; and
    outputting the retrieved intermediate image and the final decoded image according to the user's purpose.

8. The method of claim 7, wherein a scaling process is skipped automatically by outputting the intermediate image.

9. An image processing method comprising:
    storing a plurality of intermediate images, which are generated during a process of decoding coded image data generated through a hierarchical coding of an original image and have resolutions which are different from each other and lower than a final decoded image, separately from the final decoded image;
    receiving an input to determine a user's purpose for image outputting from the user;
    retrieving an intermediate image selected from the plurality of intermediate images according to the user's purpose; and
    outputting the retrieved intermediate image and the final decoded image according to the user's purpose.

10. The method of claim 9, wherein a scaling process is skipped automatically by outputting the intermediate image.

11. A computer-readable medium having a data structure stored thereon, the data structure comprising:
    a first data region which stores identification information of an original image;
    a second data region which stores an intermediate image which is generated during a process of coding the original image to generate a coded image and is selected for use in generation of a desired image according to a user's purpose; and
    a header region which includes link information to connect the first and the second data regions.

12. The computer-readable medium of claim 11, wherein the coding of the original image is a hierarchical coding, and the intermediate image is an image which contains a low frequency component of the original image as a basic component.

13. The computer-readable medium of claim 11, wherein the coding of the original image is a hierarchical coding, and the intermediate image is an image with a lower resolution than the original image.

14. The computer-readable medium of claim 11, wherein the coding of the original image comprises a first processing step in which an image generated thereby remains intact to such, an extent that the image can be displayed without a decoding process in such a manner that the original image is displayed, and a second processing step in which the image cannot be displayed without a decoding process in such a manner that the original image is displayed, and the intermediate image is generated within the first processing step.

15. An image coding apparatus comprising
    a coding unit which codes an original image and generates a first coded image; and
    an intermediate image memory which stores an intermediate image generated during the coding process and has a lower resolution than the original image, separately from the first coded image, wherein the coding unit receives an input to determine a user's purpose for using a second coded image from the user; retrieves the intermediate image from the intermediate image memory according to the user's purpose; and generates the second coded image with a suitable resolution for the user's purpose by performing a coding process the intermediate image as a new original image.

16. The apparatus of claim 15, wherein the coding unit generates the intermediate image by hierarchizing the original image.

17. The apparatus of claim 16, wherein the coding unit generates the intermediate image on a basis of a low frequency component of the original image.

18. The apparatus of claim 16, wherein the coding unit generates the intermediate image using a sub-band which appears when a two-dimensional wavelet transform is conducted on the original image, and which is composed of low frequency components in x, y directions.

19. The apparatus of claim 15, wherein the intermediate image memory stores the intermediate image in relation with the original image.

20. The apparatus of claim 15, further comprising an image selecting unit which selects either the original image or the intermediate image according to the user's purpose, and forwards the selected image to the coding unit.

21. An image coding apparatus comprising:
a shooting block;
a block which controls the shooting block mechanically; and
a processing block which processes a digital image obtained by the shooting block,
wherein the processing block comprises:
a coding unit which codes the digital image and generates a first coded image; and
an intermediate image memory which stores an intermediate image generated during the coding process and has a lower resolution than an original image, separately from the first coded image,
and the coding unit receives an input to determine a user's purpose for using a second coded image from the user, retrieves the intermediate image from the intermediate image memory according to the user's purpose, and generates the second coded image with a suitable resolution for the user's purpose by performing a coding process using the intermediate image as a new original image.

22. An image decoding apparatus comprising:
a decoding unit which decodes coded image data which are generated when an original image is coded;
an intermediate image memory which stores a plurality of intermediate images which are generated during the decoding process and have resolutions which are different from each other and lower than a final decoded image decoded by the decoding unit, separately from the final decoded image;
an image selecting unit which receives an input to determine a user's purpose for image outputting from the user, retrieves an intermediate image, which is selected according to the user's purpose, from the intermediate image memory, and outputs the retrieved intermediate image and the final decoded image.

23. The apparatus of claim 22, wherein the decoding unit conducts the decoding process on an assumption that the original image is coded hierarchically and generates the intermediate image.

24. The apparatus of claim 22, wherein the intermediate image includes mainly a low frequency component of the final decoded image.

25. The apparatus of claim 22, wherein the decoding unit conducts a two-dimensional wavelet inverse transform during the decoding process and generates the intermediate image using a sub-band which is composed of low, frequency components in x, y directions.

26. The apparatus of claim 22, wherein the intermediate image memory stores the intermediate image in relation with the final decoded image.

27. The apparatus of claim 22, wherein the image selecting unit which selects either the final decoded image or the intermediate image according to the user's purpose and outputs the selected image.

28. An image decoding apparatus comprising:
a receiving block which receives a signal;
a processing block which processes the received signal; and
a play-back block which plays back the processed signal,
wherein the processing block comprises:
a decoding unit which decodes coded image data which comprise a digital image extracted from the received signal; and
an intermediate image memory which stores a plurality of intermediate images generated during the decoding process and have resolutions which are different from each other and lower than a final decoded image decoded by the decoding unit, separately from the final decoded image, and
the apparatus further comprising an interface block which receives an input to determine a user's purpose for image outputting from the user, retrieves an intermediate image, which is selected according to the user's purpose, from the intermediate image memory, and outputs the retrieved intermediate image to an external device.

29. An image processing method comprising:
storing a plurality of intermediate images which are generated during a process of coding an original image to generate a first coded image and have resolutions which are different from each other and lower than the original image;
receiving an input to determine a user's purpose for using a second coded image from the user;
determining a suitable resolution for the user's purpose by referring to an image size table which records resolutions suitable for each purpose for using a coded image;
retrieving an intermediate image which has the suitable resolution for the user's purpose; and
generating the second coded image with the suitable resolution by performing a coding process using the retrieved intermediate image as a new original image.

* * * * *